UNITED STATES PATENT OFFICE.

ANDREW A. DUNHAM, OF BAINBRIDGE, NEW YORK, ASSIGNOR TO THE CASEIN MANUFACTURING COMPANY, A CORPORATION OF VERMONT.

ART OF PRODUCING A COMPOSITION OF CASEIN AND HYDROXIDE.

1,412,462.  Specification of Letters Patent.  Patented Apr. 11, 1922.

No Drawing.  Application filed November 5, 1920. Serial No. 421,921.

*To all whom it may concern:*

Be it known that I, ANDREW A. DUNHAM, a citizen of the United States, residing at Bainbridge, in the county of Chenango and State of New York, have invented or discovered certain new and useful Improvements in the Art of Producing a Composition of Casein and Hydroxide, of which the following is a specification.

This invention relates to the art of producing a compound or composition of casein and an alkaline earth hydroxide made by effecting a water solution of the constituents and then driving off the water. By these steps, carried out in the manner hereinafter described, a product is obtained which will be soluble in hot or cold water.

Compositions of casein and hydroxides of the alkaline earth metals are not new and I do not wish to claim such compositions in the broadest sense. So far as I am informed solutions of casein effected by treating casein with an alkaline earth hydroxide are open to the objection that if the solutions are evaporated in the ordinary way, or slowly dried, the resulting dried product is found to be insoluble in water; also, that if the solutions are heated strongly in the ordinary way the casein becomes insoluble, being precipitated or thrown out of the solution.

I have, however, discovered that if such solutions are dried very quickly by subjecting same to a high temperature for an extremely short period of time (the temperature being maintained until drying is completed) the resulting dry product will be soluble in both hot and cold water. The particular object of the present invention is to produce compounds or compositions of casein and the hydroxides of the alkaline earth metals that will be soluble in water.

The following is a description of the method which I have found most advantageous and which I prefer to follow, although it is to be understood that I do not wish to limit myself to the exact method nor to the exact proportions of ingredients hereinafter mentioned, as any method producing the product which I claim as my invention may be used; furthermore, the percentage of ingredients may be changed somewhat so long as they produce the compound of casein and an hydroxide of the alkaline earth metals soluble in water.

The method which I prefer to employ is as follows: Clean skim-milk, as free as possible from fat, is allowed to stand until such time as self-souring has proceeded sufficiently to cause the casein in the skim-milk to coagulate. In order to hasten the process lactic acid or lactic acid bacteria may be added to the skim-milk. As soon as coagulation is complete the whey is drawn from the curd (the coagulated casein) and the curd washed thoroughly with water. I have found that washing the curd six times thoroughly with luke-warm water will ordinarily suffice.

I then add to this curd about five times its weight of water breaking the curd up as thoroughly as possible. I then add an amount of calcium hydroxide equal, approximately, to 5% of the dry weight of the casein used. The mixture is then agitated by any proper means until a perfect solution of the casein results. The solution is then strained through cheese cloth and dried by exposing it in a very thin film to the action of a moving surface heated in excess of 212° F. in order to rapidly remove the moisture from the same and produce a substantially dry product. A rotating steam heated cylinder such, for example, as is shown in the Just Patent No. 712,545, Nov. 4, 1902, may be utilized for this evaporating purpose, and as the cylinder rotates the dried product is removed therefrom by a stationary doctor or scraper in the form of a thin film of a porous, scaly or flaky character, with an alkaline reaction and saline taste, soluble in water, and will consist of a composition of casein and calcium hydroxide or, more broadly stated, of casein and the hydroxide of an alkaline earth metal.

I am aware that casein solutions heretofore have been dried in thin films on heated surfaces, but so far as I am informed solutions of casein in combination with an hydroxide of an alkaline earth metal have not been dried in this way.

Having thus described my invention I claim and desire to secure by Letters Patent:

1. The method of producing a composition of casein and an alkaline earth hydroxide, consisting in making a solution of casein and the hydroxide and then quickly drying the composition in a thin film to a solid condition on a surface heated in excess of 212° F.

2. The method of producing a composition of casein and an alkaline earth hydroxide, consisting in making a solution of about 95 parts (by dry weight) of casein and about 5 parts of the hydroxide and then quickly drying the composition in a thin film to a solid condition on a surface heated in excess of 212° F.

3. The method of producing a composition of casein and calcium hydroxide, consisting in making a solution of casein and the hydroxide and then quickly drying the composition in a thin film to a solid condition on a surface heated in excess of 212° F.

4. The method of producing a composition of casein and calcium hydroxide, consisting in making a solution of about 95 parts (by dry weight) of casein and about 5 parts of the hydroxide and then quickly drying the composition in a thin film to a solid condition on a surface heated in excess of 212° F.

5. A new composition of matter consisting of casein and an alkaline earth hydroxide in the form of a dry, porous, scale or flake with an alkaline reaction and saline taste and soluble in water.

6. A new composition of matter consisting of casein and a calcium hydroxide in the form of a dry, porous, scale or flake with an alkaline reaction and saline taste and soluble in water.

7. A new composition of matter consisting of 95 parts casein and about 5 parts of an alkaline earth hydroxide in the form of a dry, porous, scale or flake with an alkaline reaction and saline taste and soluble in water.

8. A new composition of matter consisting of about 95 parts casein and about 5 parts of calcium hydroxide in the form of a dry, porous, scale or flake with an alkaline reaction and saline taste and soluble in water.

In testimony whereof I affix my signature.

ANDREW A. DUNHAM.